United States Patent [19]

Auner et al.

[11] Patent Number: 6,136,940

[45] Date of Patent: Oct. 24, 2000

[54] SILACYCLOBUTANE COMPOUNDS, METHODS OF PREPARING SAME, AND POLYMERS FORMED THEREFROM

[75] Inventors: Norbert Auner, Frankfurt am Main; Martin Grasmann, Berlin, both of Germany

[73] Assignee: Dow Corning Limited, Barry, United Kingdom

[21] Appl. No.: 09/298,389

[22] Filed: Apr. 23, 1999

[51] Int. Cl.[7] ................................................. C08G 77/06
[52] U.S. Cl. .............................. 528/37; 528/40; 528/14; 556/450; 556/452; 556/430
[58] Field of Search ................................. 528/37, 40, 14; 556/450, 452, 430

[56] References Cited

U.S. PATENT DOCUMENTS

| | | |
|---|---|---|
| 4,965,367 | 10/1990 | Baney . |
| 4,985,565 | 1/1991 | Baney et al. ........................ 548/110 |
| 5,001,187 | 3/1991 | Lilwa et al. ........................ 524/745 |
| 5,017,671 | 5/1991 | Bilgrien . |

FOREIGN PATENT DOCUMENTS 2 326 417  12/1998  United Kingdom ........... C08G 77/04

OTHER PUBLICATIONS

Organometallics 1993, 12(10), 4123–4134.
Chem. Ber. 1993, 126, 2177–2186.

Primary Examiner—Robert Dawson
Assistant Examiner—Kuo-Liang Peng
Attorney, Agent, or Firm—Larry A. Milco

[57] ABSTRACT

A silacyclobutane compound having the formula:

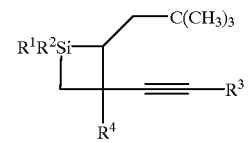

wherein $R^1$ and $R^2$ are independently chloro, triorganosiloxy, organooxy, triorganosilyl, or a monovalent hydrocarbon group; $R^3$ is a monovalent hydrocarbon group free of conjugated aliphatic unsaturation, triorganosilyl, or hydrogen; and $R^4$ is a monovalent saturated hydrocarbon group; provided that when $R^3$ is hydrogen, neither $R^1$ nor $R^2$ is chloro or organooxy. Methods of preparing the silacyclobutane compounds, silane polymers containing at least one silacyclobutane unit, and siloxane polymers containing at least one silacyclobutane unit.

24 Claims, No Drawings

SILACYCLOBUTANE COMPOUNDS, METHODS OF PREPARING SAME, AND POLYMERS FORMED THEREFROM

FIELD OF THE INVENTION

The present invention relates to silacyclobutane compounds, and more particularly to silacyclobutane compounds having a substituted or unsubstituted ethynyl group attached to the ring C-3 position. The present invention also relates to methods of preparing the silacyclobutane compounds, to silane polymers containing at least one silacyclobutane unit, and to siloxane polymers containing at least one silacyclobutane unit.

BACKGROUND OF THE INVENTION

Silacylcobutanes, methods for the preparation thereof, and polymers containing silacyclobutane units are known in the art. For example, U.S. Pat. No. 4,985,565 to Baney et al. discloses a silacyclobutane having the formula:

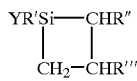

where R' is a monovalent substituted or unsubstituted hydrocarbon group or Y, R" and R'" are independently hydrogen or a monovalent substituted or unsubstituted hydrocarbon group, Y is a monovalent group having a nitrogen or oxygen atom bonded to the silicon atom of the silacyclobutane, and x is from 0 to 3.

U.S. Pat. No. 5,001,187 to Liles et al. discloses an aqueous silicone emulsion of polydiorganosiloxane having silacyclobutane groups, comprising the product obtained by the emulsion polymerization of a polydiorganosiloxane oligomer having the formula $HO(R^a{}_2SiO)_mH$ and a silacyclobutane having the formula:

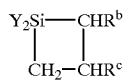

wherein Y is a group or atom reactive with the SiOH group of the oligomer; $R^a$ is a monovalent hydrocarbon or substituted hydrocarbon group having 1 to 6 carbon atoms; $R^b$ and $R^c$ are hydrogen, hydrocarbon groups, or substituted hydrocarbon groups; and m is from 3 to 500.

Auner et al. disclose the synthesis of silicon dichloro substituted 3-vinyl-1-silacyclobutanes by reaction of equimolar amounts of trichlorovinylsilane and tert-butyllithium and an excess of a 1,3-butadiene (Organometallics 1993, 12(10), 4123–4134).

UK Patent Application GB 2326417 to Auner et al. discloses silacyclobutane compounds, silacyclobutene compounds, and siloxane polymers containing silacyclobutane and/or silacyclobutene units. The silacyclobutane compounds have the formula:

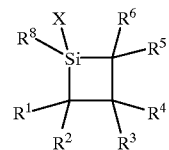

wherein $R^1$, $R^2$, $R^3$, $R^4$, and $R^5$ are independently a hydrocarbon group or hydrogen; $R^6$ is alkyl having at least 4 carbon atoms, X is a hydrolyzable group, and $R^8$ is $R^1$ or X. Examples of X include halogen and hydrocarbonoxy. The UK patent application teaches that $R^1$ and $R^4$ are preferably methyl groups or vinyl groups. The UK patent application also teaches that the siloxane polymers have improved resistance to low temperatures.

Although the above-cited references disclose various silacyclobutane compounds, none of the references teach the silacyclobutane compounds of the present invention having a substituted or unsubstituted ethynyl group attached to the ring C-3 position, the method of preparing the silacyclobutane compounds, the silane polymers, or the siloxane polymers of the present invention.

SUMMARY OF THE INVENTION

The present inventors have discovered that treating a mixture of an appropriately substituted chlorovinylsilane and a conjugated enyne with tert-butyllithium produces a silacyclobutane compound having a substituted ethynyl group attached to the ring C-3 position.

Specifically, the present invention is directed to a silacyclobutane compound having the formula:

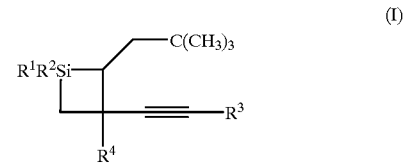

(I)

wherein $R^1$ and $R^2$ are independently chloro, triorganosiloxy, organooxy, triorganosilyl, or a monovalent hydrocarbon group; $R^3$ is a monovalent hydrocarbon group free of conjugated aliphatic unsaturation, triorganosilyl, or hydrogen; and $R^4$ is a monovalent saturated hydrocarbon group; provided that when $R^3$ is hydrogen, neither $R^1$ nor $R^2$ is chloro or organooxy.

The present invention is also directed to a method of preparing a silacyclobutane compound, comprising contacting a mixture comprising a chlorovinylsilane having the formula:

$R^1R^2ClSiCH=CH_2$ and a conjugated enyne having the formula:

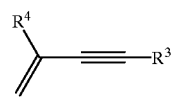

with tert-butyllithium, wherein $R^1$ and $R^2$ are independently chloro or triorganosiloxy; $R^3$ is a monovalent hydrocarbon group free of conjugated aliphatic unsaturation or triorganosilyl; and $R^4$ is a monovalent saturated hydrocarbon group.

The present invention is further directed to a silane polymer containing at least one silacyclobutane unit having the formula:

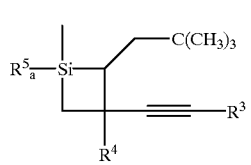

(II)

wherein $R^3$ is a monovalent hydrocarbon group free of conjugated aliphatic unsaturation or triorganosilyl; $R^4$ is a monovalent saturated hydrocarbon group; $R^5$ is chloro, triorganosiloxy, organooxy, triorganosilyl, or a monovalent hydrocarbon group; and a is 0 or 1.

The instant invention is still further directed to a siloxane polymer containing at least one silacyclobutane unit having the formula:

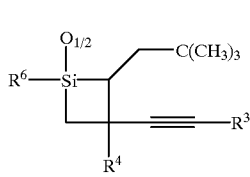

(III)

wherein $R^3$ is a monovalent hydrocarbon group free of conjugated aliphatic unsaturation, triorganosilyl, or hydrogen; $R^4$ is a monovalent saturated hydrocarbon group; and $R^6$ is chloro, triorganosiloxy, organooxy, triorganosilyl, a monovalent hydrocarbon group, hydroxy, or —O—; provided that when $R^3$ is hydrogen, $R^6$ is not chloro or organooxy.

The silacyclobutane compounds of the present invention exhibit high thermal stability. In fact, the compounds can be heated in an air atmosphere at temperatures up to 100° C. without any decomposition.

The aforementioned method of preparing the silacyclobutane compounds of the present invention is highly regioselective. In other words, the present method affords a single regioisomer wherein the substituted ethynyl group in the starting conjugated enyne is attached to the ring C-3 position in the silacyclobutane compound. Regioisomeric silacyclobutane compounds having the substituted ethynyl group attached to the ring C-2 position are not detected. Moreover, the reaction proceeds in one synthetic step using readily accessible starting materials.

The silane and siloxane polymers of the present invention exhibit improved resistance to low temperatures compared to conventional polysiloxanes and polysilanes. Moreover, the silane and siloxane polymers of the instant invention contain at least one silacyclobutane unit having a substituted or unsubstituted ethynyl group attached to the ring C-3 position. The carbon-carbon triple bond of the ethynyl group in the silacyclobutane units is reactive in hydrosilylation reactions with compounds containing silicon-bonded hydrogen atoms.

The silacyclobutane compounds of the present invention are particularly useful for preparing silane and siloxane polymers, including homopolymers and copolymers. The silacyclobutane compounds of the instant invention having at least one chloro group attached to the ring silicon atom are useful for preparing silane polymers and silylating silica or glass surfaces. The silacyclobutane compounds of the present invention having at least one chloro, triorganosiloxy, or organooxy group attached to the ring silicon atom are useful for preparing siloxane polymers and endcapping siloxane polymers and siloxane resins.

The silacyclobutane compounds of the instant invention having a substituted or unsubstituted ethynyl group attached to the ring C-3 position can be used in hydrosilylation reactions with compounds having silicon-bonded hydrogen atoms, such as polysiloxanes and polysilanes, to produce polysiloxanes or polysilanes containing terminal and/or pendant silacyclobutane rings.

The silane polymers of the present invention are useful for the preparation of silicon carbide by pyrolysis.

The siloxane polymers of the present invention are useful as ingredients in compositions exposed to low temperatures, such as transformer fluids and brake fluids. The siloxane polymers of the instant invention are also useful for the preparation of hydrosilylation curable silicone compositions, which further comprise an organohydrogensiloxane crosslinking agent.

These and other features, aspects, and advantages of the present invention will become better understood with reference to the following description and appended claims.

DETAILED DESCRIPTION OF THE INVENTION

As used herein, the term "substituted or unsubstituted ethynyl group" refers to a group having the formula —C≡CR$^3$, wherein $R^3$ is defined below.

A silacyclobutane compound according to the present invention has the formula:

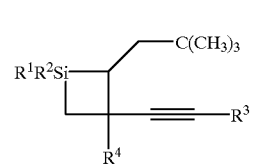

(I)

wherein $R^1$ and $R^2$ are independently chloro, triorganosiloxy, organooxy, triorganosilyl, or a monovalent hydrocarbon group; $R^3$ is a monovalent hydrocarbon group free of conjugated aliphatic unsaturation, triorganosilyl, or hydrogen; and $R^4$ is a monovalent saturated hydrocarbon group; provided that when $R^3$ is hydrogen, neither $R^1$ nor $R^2$ is chloro or organooxy.

The monovalent hydrocarbon groups represented by $R^1$ and $R^2$ typically have 1 to 20 carbon atoms, preferably have 1–10 carbon atoms, and more preferably have 1–5 carbon atoms. Acyclic monovalent hydrocarbon groups containing at least 3 carbon atoms can have a branched or unbranched structure. Examples of monovalent hydrocarbon groups include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl. Examples of preferred monovalent hydrocarbon groups include methyl, ethyl, propyl, butyl, and phenyl.

The triorganosiloxy groups represented by $R^1$ and $R^2$ have the formula $R_3SiO—$, wherein each R is independently a monovalent hydrocarbon group as defined and exemplified above, including the preferred embodiments thereof. Examples of preferred triorganosiloxy groups include trimethylsiloxy, triethylsiloxy, dimethylphenylsiloxy, and diphenylmethylsiloxy.

The organooxy groups represented by $R^1$ and $R^2$ have the formula $RO—$, wherein R is a monovalent hydrocarbon group as defined and exemplified above, including the preferred embodiments thereof. Examples of preferred organooxy groups include methoxy, ethoxy, propoxy, butoxy, and phenoxy.

The triorganosilyl groups represented by $R^1$, $R^2$, and $R^3$ have the formula $R_3Si—$, wherein each R is independently a monovalent hydrocarbon group as defined and exemplified above, including the preferred embodiments thereof. Examples of preferred triorganosilyl groups include trimethylsilyl, triethylsilyl, dimethylphenylsilyl, and diphenylmethylsilyl.

The monovalent hydrocarbon groups represented by $R^3$ are free of conjugated aliphatic unsaturation. As used herein, the term "free of conjugated aliphatic unsaturation" means that the monovalent hydrocarbon groups do not contain an aliphatic carbon-carbon double bond or carbon-carbon triple bond conjugated to the carbon-carbon triple bond attached to the ring C-3 position of the silacyclobutane compound. These monovalent hydrocarbon groups typically have 1 to 20 carbon atoms, preferably have 1–10 carbon atoms, and more preferably have 1–5 carbon atoms. Acyclic monovalent hydrocarbon groups containing at least 3 carbon atoms can have a branched or unbranched structure. Examples of monovalent hydrocarbon groups free of conjugated aliphatic unsaturation include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; cycloalkyl, such as cyclopentyl, cyclohexyl, and methylcyclohexyl; aryl, such as phenyl, naphthyl, tolyl and xylyl; and aralkyl, such as benzyl and phenethyl; alkenyl, such as allyl, and 2-butenyl; arylalkenyl, such as cinnamyl; and alkynyl, such as 2-propynyl. Examples of preferred monovalent hydrocarbon groups free of conjugated aliphatic unsaturation include methyl, ethyl, propyl, butyl, and phenyl. Most preferably, the monovalent hydrocarbon group free of conjugated aliphatic unsaturation represented by $R^3$ is aryl, such as phenyl.

The monovalent saturated hydrocarbon groups represented by $R^4$ typically have 1 to 20 carbon atoms, preferably have 1–10 carbon atoms, and more preferably have 1–5 carbon atoms. Acyclic monovalent saturated hydrocarbon groups containing at least 3 carbon atoms can have a branched or unbranched structure. Examples of monovalent saturated hydrocarbon groups include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; and cycloalkyl, such as cyclopentyl, cyclohexyl, and methylcyclohexyl. Preferred monovalent saturated hydrocarbon groups include methyl, ethyl, propyl, and butyl.

Examples of silacyclobutane compounds of the present invention include, but are not limited to, 1,1-dichloro-3-methyl-2-neopentyl-3-(2-trimethylsilyethynyl)-1-silacyclobutane; 3-(but-1-yn-1-yl)-1,1-dichloro-3-methyl-2-neopentyl-1-silacyclobutane; and 1,1-dichloro-3-methyl-2-neopentyl-3-(2-phenylethynyl)-1-silacyclobutane. A preferred silacyclobutane according to the present invention is 1,1-dichloro-3-methyl-2-neopentyl-3-(2-phenylethynyl)-1-silacyclobutane.

A method of preparing a silacyclobutane compound according to the present invention comprises contacting a mixture comprising a chlorovinylsilane having the formula:

and a conjugated enyne having the formula:

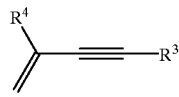

with tert-butyllithium, wherein $R^1$ and $R^2$ are independently chloro or triorganosiloxy; $R^3$ is a monovalent hydrocarbon group free of conjugated aliphatic unsaturation or triorganosilyl; and $R^4$ is a monovalent saturated hydrocarbon group.

In the above formula for the chlorovinylsilane, the triorganosiloxy groups represented by $R^1$ and $R^2$ are as defined and exemplified above for the silacyclobutane compound having formula (I), including the preferred embodiments thereof.

In the above formula for the conjugated enyne, the groups represented by $R^3$ and $R^4$ are as defined and exemplified above for the silacyclobutane compound having formula (I), including the preferred embodiments thereof.

The chlorovinylsilanes of the present method having at least one triorganosiloxy group can be prepared by reacting trichlorovinylsilane with the appropriate amount of a triorganosilanol or a triorganosilanoate according to the following scheme:

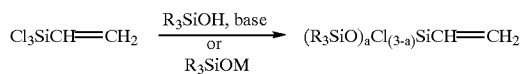

wherein R is a monovalent hydrocarbon group as defined and exemplified above for the silacyclobutene compound having formula (I), M is an alkali metal, and a is 1 or 2. A dichloro(triorganosiloxy)vinylsilane can be obtained by using one mole of the triorganosilanol or triorganosilanoate per mole of trichlorovinylsilane. A chlorodi(triorganosiloxy) vinylsilane can be obtained by using two moles of the triorganosilanol or triorganosilanoate per mole of trichlorovinylsilane. The reaction of the triorganosilanol or triorganosilanoate with trichlorovinylsilane is typically carried out in an ether solvent, such as diethyl ether or tetrahydrofuran. Additionally, the reaction of the triorganosilanol with trichlorovinylsilane is preferably carried out in the presence of a base, such as pyridine or a tertiary amine, which can combine with the liberated HCl.

A preferred method of preparing the triorganosiloxy-containing chlorovinylsilanes of the present method was used by Auner et al. to prepare chlorobis(trimethylsiloxy) vinylsilane (Chem. Ber. 1993, 126, 2177–2186). A solution of a lithium trimethylsilanoate (400 mmol) in diethyl ether (250 mL) is slowly added over a period of three hours to a solution of trichlorovinyisilane (200 mmol) in tetrahydrofuran (300 mL) at 0° C. After allowing the mixture to warm to room temperature, the ether solvents are removed by distillation. The residue is dissolved in n-pentane and the solution is refluxed for eight hours, during which time a lithium chloride precipitate forms. The solution is filtered through a glass frit (D4) to remove the lithium chloride and the filtrate is concentrated by evaporation. The residue is distilled to give chlorobis(trimethylsiloxy)vinylsilane in 64% yield. Dichloro(trimethylsiloxy)vinylsilane can be prepared using the same general procedure and equal amounts (e.g., 200 mmol) of lithium trimethylsilanoate and trichlorovinylsilane.

The conjugated enynes of the present method wherein $R^3$ is a monovalent hydrocarbon group free of conjugated aliphatic unsaturation can be prepared by well known methods in the art, including dehydration of propargylic alcohols, coupling of terminal alkynes with vinyl halides, and isomerization of certain enynes. For example, these and other methods are described by L. Brandsma in Studies in Organic Chemistry 34: Preparative Acetylenic Chemistry, 2nd ed.; Elsevier Science: Amsterdam, 1992. The particular method selected, which depends on the structure of the desired enyne, will be apparent to one skilled in the art. Some of these methods are demonstrated in the Examples below.

The conjugated enynes of the present method wherein $R^3$ is triorganosilyl group can be prepared by silylation of the corresponding enynes having the formula $HC\equiv CC(R^4)=CH_2$ according to the following scheme:

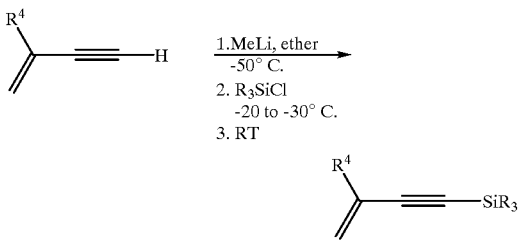

wherein R is a monovalent hydrocarbon group as defined and exemplified above for the silacyclobutane compound having formula (I), and $R^4$ is as defined and exemplified above for the silacyclobutane compound having formula (I).

In place of methyllithium, other organolithium compounds can be used, including ethyllithium, butyllithium, and phenyllithium.

The enynes having the formula $HC\equiv CC(R^4)=CH_2$ can be prepared by well known methods in the art, including dehydration of propargylic alcohols, coupling of terminal alkynes with vinyl halides, and isomerization of certain enynes. For example, these and other methods are described by L. Brandsma in Studies in Organic Chemistry 34: Preparative Acetylenic Chemistry, 2nd ed.; Elsevier Science: Amsterdam, 1992. The particular method selected, which depends on the structure of the desired enyne, will be apparent to one skilled in the art.

The preceding method of preparing conjugated enynes having a triorganosilyl group attached to the terminal triple-bonded carbon atom is described in the Examples below.

The tert-butyllithium of the present method is typically used in a hydrocarbon solvent such as pentane, hexane, or cyclohexane. Methods of preparing tert-butyllithium are very well known in the art. Solutions of tert-butyllithium in hydrocarbon solvents are commercially available in a range of concentrations. Preferably, the hydrocarbon solvent for the tert-butyllithium is the same as the hydrocarbon solvent used as a diluent for the reaction, described below, when a diluent is used.

The silacyclobutane compounds of the present method are prepared by contacting a mixture of the chlorovinylsilane and the conjugated enyne with tert-butyllithium. The reaction can be carried out in any standard reactor suitable for contacting a chlorosilane with an organolithium compound. Preferably, the reactor is equipped with a means of agitation, such as a stirring.

The present method is preferably carried out in the substantial absence of atmospheric oxygen or moisture. This can be accomplished by purging the reactor with a dry inert gas, such as nitrogen or argon, prior to the introduction of the reactants and thereafter maintaining an atmosphere of such gas in the reactor.

Although the silacyclobutane compounds of the present method can be prepared in the absence of a diluent, the chlorovinylsilane and the conjugated enyne are preferably dissolved in a hydrocarbon solvent prior to contacting the resulting mixture with tert-butyllithium. Any hydrocarbon solvent or mixture of hydrocarbon solvents that does not interfere with the reaction to produce the silacyclobutene compounds of the present method can be used as a diluent. Preferably, the hydrocarbon solvent has a normal boiling point up to about 200° C. When the hydrocarbon solvent has a boiling point above about 200° C., it may be difficult to separate the solvent from the silacyclobutene compounds by distillation. Examples of suitable hydrocarbon solvents include, but are not limited to, pentane, hexane, cyclohexane, methylcyclohexane, heptane, octane, toluene, xylene, and isomers thereof. Preferably the hydrocarbon solvent is pentane or hexane. When used, the volume of the hydrocarbon solvent is typically from 0.01 to 100 and preferably 1 to 20 times the combined volume of the chlorovinylsilane and the conjugated enyne.

The mixture of the chlorovinylsilane and the conjugated enyne can be contacted with tert-butyllithium at a temperature of from about −78° C. up to about 70° C. Preferably, the reaction is carried out at a temperature of from −78° C. to room temperature and more preferably, at room temperature.

Typically, the mixture of the chlorovinylsilane and the conjugated enyne is contacted with tert-butyllithium by slowly adding tert-butyllithium to the mixture. Preferably, a solution of tert-butyllithium in a hydrocarbon solvent is added to the mixture in a dropwise manner. Also, preferably, the reaction mixture is agitated, for example, by stirring, at least during the addition of the tert-butyllithium.

Although, the mole ratio of the chlorovinylsilane to the conjugated enyne to tert-butyllithium may vary over a wide range, preferably about equimolar amounts of these reactants are used. An excess of any one of the reactants can lead to the formation of byproducts and a lower yield of the desired silacyclobutane compound. For example, excess tert-butyllithium may react with the silacyclobutane product by displacing chloride or cleaving the triorganosiloxy-silicon bond. Excess conjugated enyne may react with tert-butyllithium to form byproducts, such as 1,2- and 1,4-addition products. Excess chlorovinylsilane may react with the tert-butyllithium to form byproducts such as disilacyclobutanes.

The silacyclobutane compounds of the present method can be recovered from their reaction mixtures by removing the lithium chloride precipitate by filtration, removing the hydrocarbon solvent by simple distillation under reduced pressure, and then fractionally distilling the residue under high vacuum.

The silacyclobutane compounds of the present invention having at least one triorganosiloxy group, organooxy group, triorganosilyl group, or monovalent hydrocarbon group attached to the ring silicon atom can be prepared from the corresponding monochlorosilacyclobutane or dichlorosilacyclobutane compounds using well known reactions of organochlorosilanes to form silicon-oxygen, silicon-silicon, and silicon-carbon bonds. The monochlorosilacyclobutane starting materials can be prepared from the corresponding dichlorosilacyclobutane compounds using these same methods. The dichlorosilacyclobutane compounds are prepared as described above.

The silacyclobutane compounds of the instant invention having at least one triorganosiloxy group attached to the ring silicon atom can be prepared by reacting the corresponding triorganosilanol or triorganosilanoate with a chlorosilacyclobutane compound according to the following scheme:

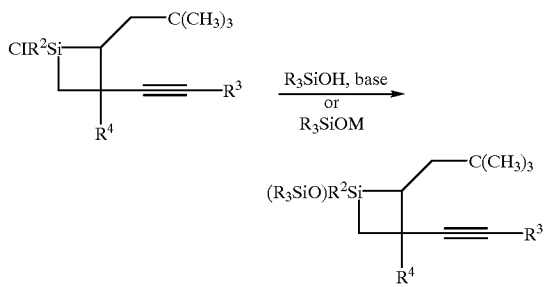

wherein R is a monovalent hydrocarbon group; M is an alkali metal; $R^2$ is chloro, triorganosiloxy, organooxy, triorganosilyl, or a monovalent hydrocarbon group; $R^3$ is a monovalent hydrocarbon group free of conjugated aliphatic unsaturation or triorganosilyl; and $R^4$ is a monovalent saturated hydrocarbon group. The groups represented by R, $R^2$, $R^3$, and $R^4$ are as defined and exemplified above for the silacyclobutane compound having formula (I).

The reaction of the triorganosilanol with the chlorosilacyclobutane is typically carried out in the presence of a base, such as pyridine or a tertiary amine, which can combine with the liberated HCl.

The triorganosilanoates can be obtained by reacting the corresponding triorgano(organooxy)silanes with an alkali metal hydroxide or by reacting the corresponding triorganosilanols with an alkali metal or alkali metal hydroxide. The triorganosilanoates can also be prepared by reacting the corresponding hexaorganodisiloxanes with sodium hydroxide in alcoholic solution or with an organolithium reagent, such as methyllithium or phenyllithium in a hydrocarbon solvent.

The reaction of the triorganosilanoate with the chlorosilacyclobutane compound is typically carried out in a hydrocarbon solvent such as toluene.

The silacyclobutane compounds of the instant invention having at least one organooxy group attached to the ring silicon atom can be prepared by reacting the corresponding alcohol or phenol with a chlorosilacyclobutane compound in the presence of a base according to the following scheme:

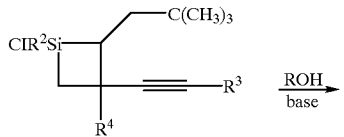

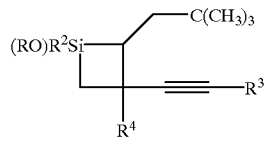

wherein R is a monovalent hydrocarbon group; $R^2$ is chloro, triorganosiloxy, organooxy, triorganosilyl, or a monovalent hydrocarbon group; $R^3$ is a monovalent hydrocarbon group free of conjugated aliphatic unsaturation or triorganosilyl; and $R^4$ is a monovalent saturated hydrocarbon group. The groups represented by R, $R^2$, $R^3$, and $R^4$ are as defined and exemplified above for the silacyclobutane compound having formula (I).

The reaction of the alcohol or phenol with the chlorosilacyclobutane compound is typically carried out in the presence of a base, such as pyridine or a tertiary amine, which can combine with the liberated HCl.

Preferably, the alcohol or phenol is substantially free of water. The reaction of the alcohol or phenol with the chlorosilacyclobutane compound is frequently carried out using excess alcohol or phenol as the solvent. However, excess alcohol or phenol should be avoided when preparing a mono(organooxy)silacyclobutane compound from a dichlorosilacyclobutane compound. The reaction of the alcohol or phenol with the chlorosilacyclobutane compound can also be carried out in an inert solvent such as ether or toluene.

The silacyclobutane compounds of the present invention having at least one triorganosilyl group attached to the ring silicon atom can be prepared by reacting the corresponding triorganosilyl-alkali metal compound with a chlorosilacyclobutane compound according to the following scheme:

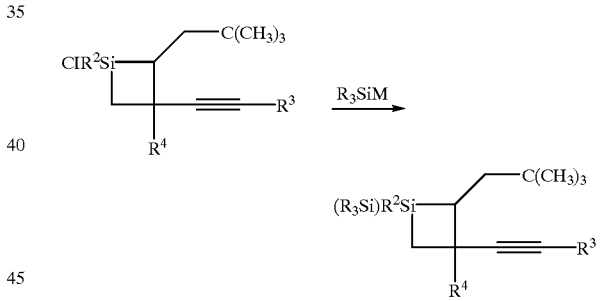

wherein R is a monovalent hydrocarbon group; M is an alkali metal; $R^2$ is chloro, triorganosiloxy, organooxy, triorganosilyl, or a monovalent hydrocarbon group; $R^3$ is a monovalent hydrocarbon group free of conjugated aliphatic unsaturation or triorganosilyl; and $R^4$ is a monovalent saturated hydrocarbon group. The groups represented by R, $R^2$, $R^3$, and $R^4$ are as defined and exemplified above for the silacyclobutane compound having formula (I).

The triorganosilyl-alkali metal compounds can be obtained by reacting the corresponding hexaorganodisilanes with an alkali metal in an ether solvent. These compounds can also be prepared in good yield by reacting the corresponding chlorosilanes with lithium metal in tetrahydrofuran.

The reaction of the triorganosilyl-alkali metal compound with the chlorosilacyclobutane compound is typically carried out in an ether solvent, such as tetrahydrofuran, at room temperature.

The silacyclobutane compounds of the present invention having at least one monovalent hydrocarbon group attached to the ring silicon atom can be prepared by reacting the corresponding Grignard reagent or organometallic compound with a chlorosilacyclobutane compound according to the following scheme:

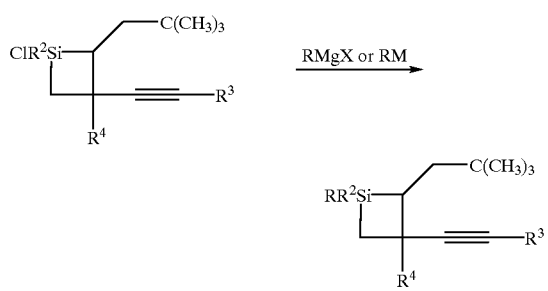

wherein R is a monovalent hydrocarbon group; M is a metal; X is chloro or bromo; $R^2$ is chloro, triorganosiloxy, organooxy, triorganosilyl, or a monovalent hydrocarbon group; $R^3$ is a monovalent hydrocarbon group free of conjugated aliphatic unsaturation or triorganosilyl; and $R^4$ is a monovalent saturated hydrocarbon group. The groups represented by R, $R^2$, $R^3$, and $R^4$ are as defined and exemplified above for the silacyclobutane compound having formula (I).

The organometallic compound can be any of the common organometallic compounds that are reactive with organochlorosilanes, including organolithium, organosodium, organopotassium, and organozinc compounds. Organolithium compounds are preferred due to their greater reactivity.

The reaction of the Grignard reagent or organometallic compound with the chlorosilacyclobutane compound is typically carried out in an ether, such as diethyl ether, or a hydrocarbon solvent, such as toluene.

The silacyclobutane compounds of the present invention having formula (I) wherein $R^3$ is hydrogen can be prepared by desilylation of the corresponding (triorganosilyl)ethynylsilacyclobutane compounds using the well known Arens-Schmidt reaction, according to the following scheme:

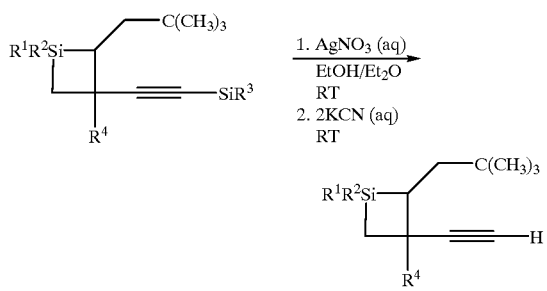

wherein R is a monovalent hydrocarbon group; $R^1$ and $R^2$ are independently triorganosiloxy, triorganosilyl, or a monovalent hydrocarbon group; and $R^4$ is a monovalent saturated hydrocarbon group. The groups represented by R, $R^1$, $R^2$, and $R^4$ are as defined and exemplified above for the silacyclobutane compound having formula (I).

The Arens-Schmidt desilylation reaction is carried out by first reacting the (triorganosilyl)ethynylsilacyclobutane compound with an equimolar amount of silver nitrate in an aqueous ethanol solution (ethanol:water=2:1) at room temperature. The resulting silver salt, which can be isolated from the reaction mixture, is then treated with an aqueous solution of potassium cyanide (2 moles of KCN per mole of the silacyclobutane compound) at room temperature.

A silane polymer according to the present invention contains at least one silacyclobutane unit having the formula:

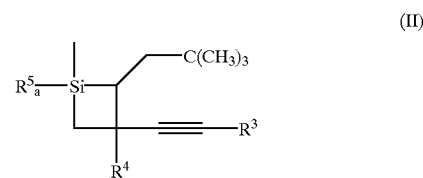

(II)

wherein $R^3$ is a monovalent hydrocarbon group free of conjugated aliphatic unsaturation or triorganosilyl; $R^4$ is a monovalent saturated hydrocarbon group; $R^5$ is chloro, triorganosiloxy, organooxy, triorganosilyl, or a monovalent hydrocarbon group; and a is 0 or 1.

In formula (II) above, the groups represented by $R^3$, $R^4$, and $R^5$ are as defined and exemplified above for the silacyclobutane compound having formula (I), including the preferred embodiments thereof. The silane polymers of the present invention have a degree of polymerization typically from 3 to about 1000 and preferably from 5 to about 200.

The silane polymers of the instant invention include, but are not limited to, homopolymers and copolymers containing silacyclobutane units having formula (II). One type of copolymer contains only silacyclobutane units, wherein at least two different silacyclobutane units are present. Another type of copolymer contains silacyclobutane units and organosilane units having the formula $R_2Si$ wherein R is a monovalent hydrocarbon group as defined above for the silacyclobutane compound having formula (I).

The silane polymer of the present invention can be prepared using any of the well known methods of preparing polysilanes from organochlorosilanes. Preferably, the silane polymer of the present invention is prepared using the Wurtz coupling reaction by reacting at least one chlorosilacyclobutane compound, or a mixture of at least one chlorosilacyclobutane compound and an organochlorosilane compound in a hydrocarbon solvent in the presence of sodium (or lithium) metal. Chlorosilacyclobutane compounds suitable for use in preparing the silane polymers of the present invention have formula (I) wherein at least one of $R^1$ and $R^2$ is chloro. Organochlorosilane compounds suitable for use in the Wurtz coupling reaction include, but are not limited to, compounds having the formula $R_mSiCl_{(4-m)}$ and silane oligomers and silane polymers containing at least one silicon-bonded chlorine atom, wherein R and the organic groups in the oligomers and polymers are monovalent hydrocarbon groups as defined above for the silacyclobutane compound having formula (I), and m is 2 or 3.

Preferably, the Wurtz reaction is carried out in a hydrocarbon solvent having a boiling point above about 100° C., such as toluene, under reflux conditions. The polymer product can be recovered by removing the sodium (or lithium) chloride by filtration and then concentrating the filtrate under reduced pressure.

A siloxane polymer according to the present invention contains at least one silacyclobutane unit having the formula:

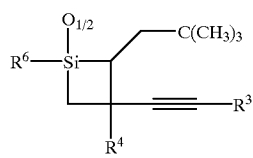

(III)

wherein $R^3$ is a monovalent hydrocarbon group free of conjugated aliphatic unsaturation, triorganosilyl, or hydrogen; $R^4$ is a monovalent saturated hydrocarbon group; and $R^6$ is chloro, triorganosiloxy, organooxy, triorganosilyl, a monovalent hydrocarbon group, hydroxy, or —O—; provided that when $R^3$ is hydrogen, $R^6$ is not chloro or organooxy.

In formula (III) above, the groups represented by $R^3$, $R^4$, $R^6$ are as defined and exemplified above for the silacyclobutane compound having formula (I), including the preferred embodiments thereof. The siloxane polymers of the present invention have a degree of polymerization typically from 3 to about 1000 and preferably from 5 to about 200.

The siloxane polymers of the instant invention include, but are not limited to, homopolymers and copolymers containing silacyclobutane units having formula (III). One type of copolymer contains only silacyclobutane units, wherein at least two different silacyclobutane units are present. Another type of copolymer contains silacyclobutane units and organosiloxane units having the formula $R_2SiO_{2/2}$ wherein R is a monovalent hydrocarbon as defined above for the silacyclobutane compound having formula (I).

The siloxane polymers of the present invention can be prepared using any of the well known methods of preparing siloxane polymers, including hydrolysis and equilibration. For example, the siloxane polymers of the instant invention can be prepared by hydrolyzing at least one chlorosilacyclobutane compound, or a mixture of at least one chlorosilacyclobutane compound and an organochlorosilane compound. Chlorosilacyclobutane compounds suitable for use in preparing the siloxane polymers of the present invention by hydrolysis have formula (I) wherein at least one of $R^1$ and $R^2$ is chloro. Organochlorosilane compounds suitable for use in the hydrolysis reaction include, but are not limited to, compounds having the formula $R_mSiCl_{(4-m)}$ and siloxane oligomers and siloxane polymers containing at least one silicon-bonded chlorine atom, wherein R and the organic groups in the oligomers and polymers are monovalent hydrocarbon groups as defined above for the silacyclobutane compound having formula (I), and m is 2 or 3.

The siloxane polymers of the present invention can also be prepared by hydrolyzing at least one (organooxy) silacyclobutane compound, or a mixture of at least one (organooxy)silacyclobutane compound and an organo (organooxy)silane compound. (Organooxysilacyclobutane) compounds suitable for use in preparing the siloxane polymers of the present invention by hydrolysis have formula (I) wherein at least one of $R^1$ and $R^2$ is organooxy. Organo (organooxy)silane compounds suitable for use in the hydrolysis reaction include, but are not limited to, compounds having the formula $R_mSi(OR)_{4-m}$ and siloxane oligomers and polymers containing at least one silicon-bonded organooxy group, wherein R and the organic groups in the oligomers and polymers are monovalent hydrocarbon groups as defined above for the silacyclobutane compound having formula (I), and m is 2 or 3.

The hydrolysis of the (organooxy)silacyclobutane compounds can be carried out in the presence of an acid or base catalyst. Acid catalysts which can be removed by washing, such as hydrochloric acid, oxalic acid, acetic acid, and trichloracetic acid are preferred.

The siloxane polymers of the present invention can also be prepared by equilibration of at least one (triorganosiloxy) silacyclobutane compound, or a mixture of at least one (triorganosiloxy)silacyclcobutane compound and an organosiloxane compound. (Triorganosiloxy)silacyclobutane compounds suitable for use in preparing the siloxane polymers of the present invention have formula (I) wherein at least one of $R^1$ and $R^2$ is triorganosiloxy. The organosiloxane compounds used in the equilibration reaction can be any common organosiloxane compounds, including disiloxanes having the formula $(R_3—Si)_2O$, organocyclosiloxanes having the formula $(R_2SiO)_n$, siloxane oligomers, and siloxane polymers, wherein R and the organic groups in the oligomers and polymers are monovalent hydrocarbon groups as defined above for the silacyclobutane compound having formula (I), and n is from 3 to about 10. Examples of organocyclosiloxanes include, but are not limited to, octamethyltetracyclosiloxane ($D_4$) and decamethylpentacyclosiloxane ($D_5$). Examples of siloxane oligomers and polymers include, but are not limited to, dimethylsiloxane fluids.

The aforementioned equilibration reaction is typically carried out in the presence of a strong acid or base. Examples of suitable acids include, but are not limited to, sulfuric acid, trifluormethanesulfonic acid, and dodecylbenzenesulfonic acid. Examples of suitable bases include, but are not limited to, potassium hydroxide and tetrabutylammonium hydroxide.

The silacyclobutane compounds of the present invention exhibit high thermal stability. In fact, the compounds can be heated in an air atmosphere at temperatures up to 100° C. without any decomposition.

The aforementioned method of preparing the silacyclobutane compounds of the present invention is highly regioselective. In other words, the present method affords a single regioisomer wherein the substituted ethynyl group in the starting conjugated enyne is attached to the ring C-3 position in the silacyclobutane compound. Regioisomeric silacyclobutane compounds having the substituted ethynyl group attached to the ring C-2 position are not detected. Moreover, the reaction proceeds in one synthetic step using readily accessible starting materials.

The silane and siloxane polymers of the present invention exhibit improved resistance to low temperatures compared to conventional polysiloxanes and polysilanes. Moreover, the silane and siloxane polymers of the instant invention contain at least one silacyclobutane unit having a substituted or unsubstituted ethynyl group attached to the ring C-3 position. The carbon-carbon triple bond of the ethynyl group in the silacyclobutane units is reactive in hydrosilylation reactions with compounds containing silicon-bonded hydrogen atoms.

The silacyclobutane compounds of the present invention are particularly useful for preparing silane and siloxane polymers, including homopolymers and copolymers. The silacyclobutane compounds of the instant invention having at least one chloro group attached to the ring silicon atom are useful for preparing silane polymers and silylating silica or glass surfaces. The silacyclobutane compounds of the present invention having at least one chloro, triorganosiloxy, or organooxy group attached to the ring silicon atom are useful for preparing siloxane polymers and endcapping siloxane polymers and siloxane resins.

The silacyclobutane compounds of the instant invention having a substituted or unsubstituted ethynyl group attached to the ring C-3 position can be used in hydrosilylation reactions with compounds having silicon-bonded hydrogen atoms, such as polysiloxanes and polysilanes, to produce polysiloxanes or polysilanes containing terminal and/or pendant silacyclobutane rings.

The silane polymers of the present invention are useful for the preparation of silicon carbide by pyrolysis.

The siloxane polymers of the present invention are useful as ingredients in compositions exposed to low temperatures, such as transformer fluids and brake fluids. The siloxane polymers of the instant invention are also useful for the preparation of hydrosilylation curable silicone compositions, which further comprise an organohydrogensiloxane crosslinking agent.

EXAMPLES

The following examples are presented to further illustrate the silacyclobutane compounds and methods of the present invention, but are not to be considered as limiting the invention, which is delineated in the appended claims. All parts and percentages reported in the examples are by weight.

Air and/or moisture sensitive reactions were carried out under a nitrogen or argon atmosphere. The nitrogen and argon were dried over copper catalyst and molecular sieves (4 Å). The solvents were dried by distillation according to conventional procedures. Chlorosilanes were distilled from $K_2CO_3$ prior to use. Reactions at temperatures below 0° C. were carried out using a cooling bath consisting of an ethanol/dry ice or ethanol/liquid nitrogen mixture, unless indicated otherwise.

Gas chromatography was performed using a Chrompack CP 9000 gas chromatograph equipped with a 0.25 mm×10 m Chrompack CP Sil 5 CB capillary column. Gas chromatography, in addition to NMR spectrometry, was used to determine the ratio of the Z to E isomers for the silacyclobutanes in Examples 1 and 2.

Nuclear magnetic resonance (NMR) spectra were obtained using a Bruker WP100SY ($^1H$, $^{13}C$), Jeol JNM GX 270 ($^{13}C$, $^{29}Si$), Bruker AMX 300 ($^{29}Si$), and a Bruker DPX 300 ($^1H$, $^{13}C$). The NMR solvent was deuterated chloroform, $CDCl_3$, containing tetramethylsilane as an internal standard.

Mass spectra were obtained using a Chrompack 9000 gas chromatograph coupled with a Finnigan MAT ion trap 800. Mass spectral data was collected over a mass to charge (m/z) range of 50 to 600 employing an electron flow of 300 mA, ion accelerating voltage of 3 kV, ionization potential of 70 eV, and source temperature 250° C. Methanol was used as the reactant gas in chemical ionization (CI).

Example 1

A flask was charged with 1.3 mol of acetic anhydride and 7 g of p-toluenesulfonic acid monohydrate. The acetylenic alcohol HC≡CC(CH$_3$)$_2$OH (1.0 mol) was added over 10 min with some cooling. The flask was then quickly heated until the enyne began to distill out. Further heating was carried out in a controlled way, so that the enyne did not distill too fast: the greater part passed over below 60° C. As the bath temperature was increased the reaction mixture turned very dark. When, after 45–60 min, the temperature in the head of the column had reached 100° C., heating was stopped. The distillate was washed twice in a small separatory funnel with 10–15 mL of cold 3 N KOH solution, in order to remove traces of acetic acid. Redistillation from 5 g of anhydrous $MgSO_4$ gave pure isopropenylacetylene, HC≡CC(CH$_3$)=CH$_2$ (b.p. ~35° C./760 mmHg), in excellent yield. The compound was stored in a freezer (−20 to −30° C.).

To a solution of isopropenylacetylene in diethyl ether was added 0.95 equivalents (based on the number of moles of isopropenylacetylene) of methyllithium (1.6 M in diethyl ether) dropwise at −50° C. under nitrogen. Then an equimolar amount of chlorotrimethylsilane was added to the mixture at −20 to −30° C., whereupon precipitation of lithium chloride occurred. The reaction mixture was allowed to warm slowly to room temperature in the cold bath. The diethyl ether was then removed by distillation and the residue was extracted with n-pentane. The extract was filtered through a glass frit (D4) to remove the lithium chloride and the filtrate was concentrated under reduced pressure. The resulting residue was distilled under high vacuum to give a conjugated enyne having the formula:

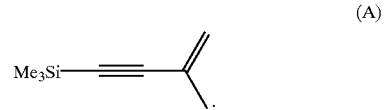

(A)

Tert-butyllithium in pentane (1.7 M, 29.4 mL, 50 mmol) was added dropwise to a stirred solution of trichlorovinylsilane (8.1 g, 6.4 mL, 50 mmol) and an equimolar amount of conjugated enyne (A) in pentane (100 mL) at 20° C. under nitrogen, whereupon precipitation of lithium chloride occurred. The mixture was stirred overnight and then filtered through a glass frit (D4) to remove the lithium chloride. The filtrate was concentrated under reduced pressure and the resulting residue was fractionally distilled through a vacuum-jacketed 40-cm vigreaux column under high vacuum (0.1 Pa) to give a colorless liquid (bp 55–59° C./0.1 Pa) consisting of a mixture of 6.68 g (20.8 mmol, 42%) of 1,1-dichloro-3-methyl-2-neopentyl-3-(2-trimethylsilylethynyl)-1-silacyclobutane, having the formula:

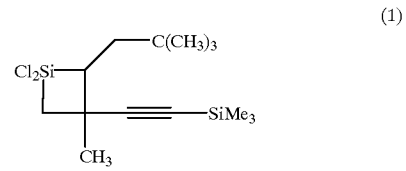

(1)

as a mixture of Z and E isomers, and 4.66 g (14.5 mmol, 29%) of 1,1 dichloro-3-(1-methylvinyl)-4-neopentyl-2-(trimethylsilyl)- 1-silacyclobut-2-ene, having the formula:

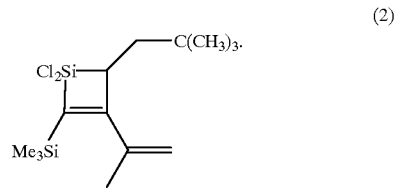

(2)

The ratio of the Z isomer (neopentyl group and trimethylsilylethynyl group on same side of silacyclobutane ring) to the E isomer (neopentyl group and trimethylsilylethynyl group on opposite sides of silacyclobutane ring) was 59:41, as determined by gas chromatography and NMR sprectrometry.

The NMR spectra ($^1H$, $^{13}C$, and $^{29}Si$), mass spectra, and elemental analysis obtained for the reaction products are consistent with the silacyclobutane and silacyclobutene compounds represented by formulae (1) and (2), respectively.

Example 2

A solution of trichlorovinylsilane and an equimolar amount of 2-methylhex-1-en-3-yne (commercially available from Lancaster, Windham, N.H.), having the formula:

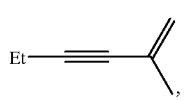
(B)

in pentane was treated with tert-butyllithium using the method in Example 1. The residue was distilled under high vacuum (0.1 Pa) to give a colorless liquid (bp 82–96 C./0.1 Pa) consisting of 4.46 g (16.1 mmol, 32%) of 3-(but-1-yn-1-yl)-1,1-dichloro-3-methyl-2-neopentyl-1-silacyclobutane, having the formula:

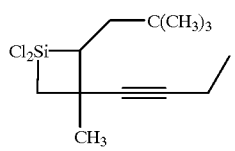
(3)

as a mixture of Z an E isomers, and 2.60 g (9.4 mmol, 19%) of 1,1 dichloro-2-ethyl-3-(1-methylvinyl)-4-neopentyl-1-silacyclobut-2-ene, having the formula:

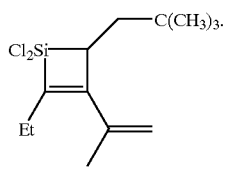
(4)

The ratio of the Z isomer (butynyl group and neopentyl group on same side of silacyclobutane ring) to the E isomer (butynyl group and neopentyl group on opposite sides of silacyclobutane ring) was 53:47, as determined by gas chromatography and NMR sprectrometry.

The NMR spectra ($^1$H, $^{13}$C, and $^{29}$Si), mass spectra, and elemental analysis obtained for the reaction products are consistent with the silacyclobutane and silacyclobutene compounds represented by formulae (3) and (4), respectively.

Example 3

A solution of 100 mmol of 2-methyl-4-phenylbut-1-en-3-ol (16.02 g) in 90 mL of tetrahydrofuran and 210 mL of carbon tetrachloride was mixed with 300 mmol (78.70 g) of dry triphenylphosphine. The solution was heated to boiling under reflux for 2 hours, whereupon a precipitate formed. After cooling, 400 mL of pentane was added and the precipitate was separated by filtration. The solvent was removed from the filtrate under reduced pressure and the residue was fractionally distilled to give 2-methyl-4-phenylbut-1-en-3-yne havng the formula:

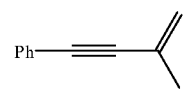
(C)

A solution of trichlorovinylsilane and an equimolar amount of conjugated enyne (C) in pentane was treated with tert-butyllithium using the method in Example 1. The residue was distilled under high vacuum (1 Pa) to give 6.83 g (21.0 mmol, 42%) of a colorless viscous liquid (bp 108–120° C./1 Pa) consisting of 1,1-dichloro-3-methyl-2-neopentyl-3-(2-phenylethynyl)-1-silacyclobutane having the formula:

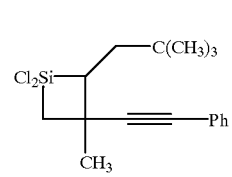
(5)

as a mixture of Z an E isomers. The ratio of the Z isomer (phenylethynyl group and neopentyl group on same side of silacyclobutane ring) to the E isomer (phenylethynyl group and neopentyl group on opposite sides of silacyclobutane ring) was 61:39, as determined by gas chromatography and NMR sprectrometry.

The NMR spectra ($^1$H, $^{13}$C, and $^{29}$Si), mass spectra, and elemental analysis obtained for the reaction products are consistent with the silacyclobutane compounds represented by formula (5).

That which is claimed is:

1. A silacyclobutane compound having the formula:

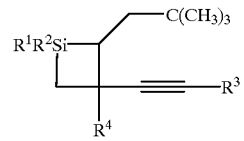

wherein $R^1$ and $R^2$ are independently chloro, triorganosiloxy, organooxy, triorganosilyl, or a monovalent hydrocarbon group; $R^3$ is a monovalent hydrocarbon group free of conjugated aliphatic unsaturation, triorganosilyl, or hydrogen; and $R^4$ is a monovalent saturated hydrocarbon group; provided that when $R^3$ is hydrogen, neither $R^1$ nor $R^2$ is chloro or organooxy.

2. The silacyclobutane compound according to claim 1, wherein $R^1$ and $R^2$ are chloro.

3. The silacyclobutane compound according to claim 1, wherein $R^3$ is triorganosilyl.

4. The silacyclobutane compound according to claim 3, wherein $R^3$ is trimethylsilyl.

5. The silacyclobutane compound according to claim 1, wherein $R^3$ is aryl.

6. The silacyclobutane compound according to claim 5, wherein $R^3$ is phenyl.

7. A method of preparing a silacyclobutane compound, comprising contacting a mixture comprising a chlorovinylsilane having the formula:

and a conjugated enyne having the formula:

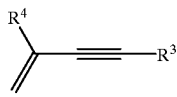

with tert-butyllithium, wherein $R^1$ and $R^2$ are independently chloro or triorganosiloxy; $R^3$ is a monovalent hydrocarbon group free of conjugated aliphatic unsaturation or triorganosilyl; and $R^4$ is a monovalent saturated hydrocarbon group.

8. The method according to claim 7, wherein the step of contacting the mixture of the chlorovinylsilane and the conjugated enyne is carried out in a hydrocarbon solvent.

9. The method according to claim 7, wherein the step of contacting the mixture of the chlorovinylsilane and the conjugated enyne is carried out at a temperature of from −78° C. to room temperature.

10. The method according to claim 7, wherein the mole ratio of the chlorovinylsilane to the conjugated enyne to tert-butyllithium is about 1:1:1.

11. The method according to claim 7, wherein $R^3$ is triorganosilyl.

12. The method according to claim 11, wherein $R^3$ is trimethylsilyl.

13. The method according to claim 7, wherein $R^3$ is aryl.

14. The method according to claim 13, wherein $R^3$ is phenyl.

15. A silane polymer containing at least one silacyclobutane unit having the formula:

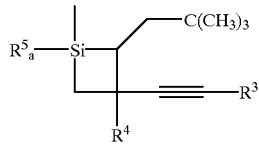

wherein $R^3$ is a monovalent hydrocarbon group free of conjugated aliphatic unsaturation or triorganosilyl; $R^4$ is a monovalent saturated hydrocarbon group; $R^5$ is chloro, triorganosiloxy, organooxy, triorganosilyl, or a monovalent hydrocarbon group; and a is 0 or 1.

16. The silane polymer according to claim 15, wherein $R^3$ is triorganosilyl.

17. The silane polymer according to claim 16, wherein $R^3$ is trimethylsilyl.

18. The silane polymer according to claim 15, wherein $R^3$ is aryl.

19. The silane polymer according to claim 18, wherein $R^3$ is phenyl.

20. A siloxane polymer containing at least one silacyclobutane unit having the formula:

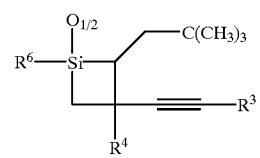

wherein $R^3$ is a monovalent hydrocarbon group free of conjugated aliphatic unsaturation, triorganosilyl, or hydrogen; $R^4$ is a monovalent saturated hydrocarbon group; and $R^6$ is chloro triorganosiloxy, organooxy, triorganosilyl, a monovalent hydrocarbon group, hydroxy, or —O—; provided that when $R^3$ is hydrogen, $R^6$ is not chloro or organooxy.

21. The siloxane polymer according to claim 20, wherein $R^3$ is triorganosilyl.

22. The siloxane polymer according to claim 21, wherein $R^3$ is trimethylsilyl.

23. The siloxane polymer according to claim 20, wherein $R^3$ is aryl.

24. The siloxane polymer according to claim 23, wherein $R^3$ is phenyl.

* * * * *